United States Patent [19]

Minnett

[11] Patent Number: 5,288,101
[45] Date of Patent: Feb. 22, 1994

[54] VARIABLE RATE TORSION CONTROL SYSTEM FOR VEHICLE SUSPENSION

[76] Inventor: Milford M. Minnett, 5 Hidden Valley Rd., Pomona, Calif. 91766

[21] Appl. No.: 889,275

[22] Filed: May 28, 1992

[51] Int. Cl.⁵ .............................................. B60G 21/04
[52] U.S. Cl. .................................... 280/689; 267/277
[58] Field of Search ...................... 280/689, 721, 723; 267/277, 278

[56] References Cited

U.S. PATENT DOCUMENTS

| | | | |
|---|---|---|---|
| 4,613,153 | 9/1986 | Shibahata | 280/689 |
| 4,700,972 | 10/1987 | Young | 280/707 |
| 4,796,911 | 1/1989 | Kuroki et al. | |
| 4,805,929 | 2/1989 | Shibata et al. | |
| 4,842,298 | 6/1989 | Jarvis | |
| 4,863,148 | 9/1989 | Hufnagel | |
| 4,892,329 | 1/1990 | Kozaki et al. | |
| 4,919,444 | 4/1990 | Leiber et al. | |
| 4,973,077 | 11/1990 | Kuwayama et al. | |

FOREIGN PATENT DOCUMENTS

| | | | |
|---|---|---|---|
| 2630698 | 1/1978 | Fed. Rep. of Germany | 280/689 |
| 59-34909 | 2/1984 | Japan | 280/721 |
| 2006131 | 5/1979 | United Kingdom | 280/689 |

OTHER PUBLICATIONS

Two page excerpt from Steve Millen Catalog.

Primary Examiner—Karin L. Tyson
Attorney, Agent, or Firm—Finnegan, Henderson, Farabow, Garrett & Dunner

[57] ABSTRACT

The invention relates to a stabilizing apparatus for a motor vehicle using a torsion bar for conveying torsional forces from one location on a motor vehicle to another location on a motor vehicle. A torsion arm with variable flex resistance along its length conveys forces from a wheel suspension component to the torsion bar. An engagement assembly is provided between the wheel suspension component and the torsion arm for selectively varying the engagement location of the suspension component along the length of the torsion arm as the vehicle moves. In this manner, the amount of leverage applied to the torsion bar can be varied, thereby changing suspension characteristics of the vehicle.

30 Claims, 8 Drawing Sheets

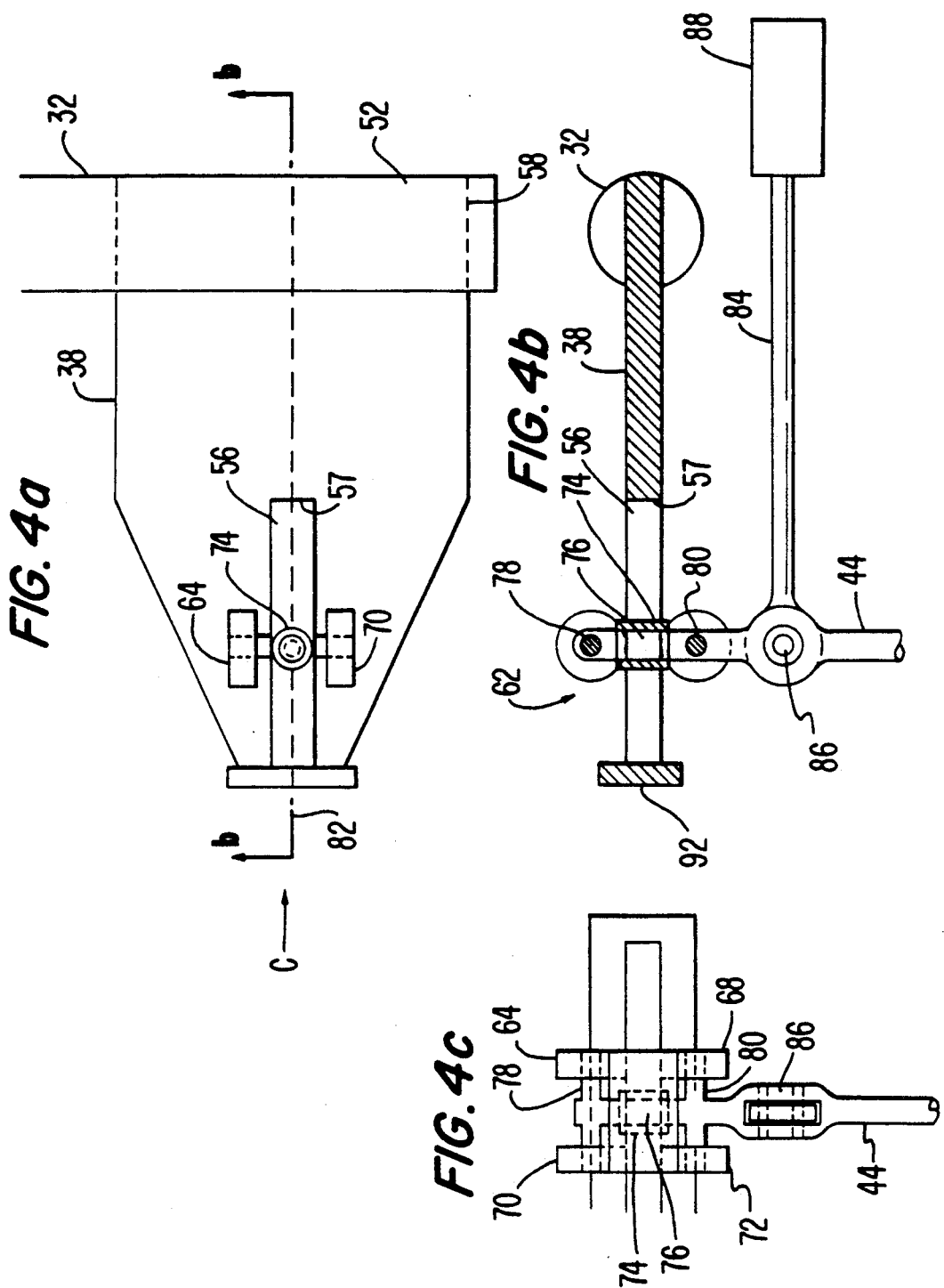

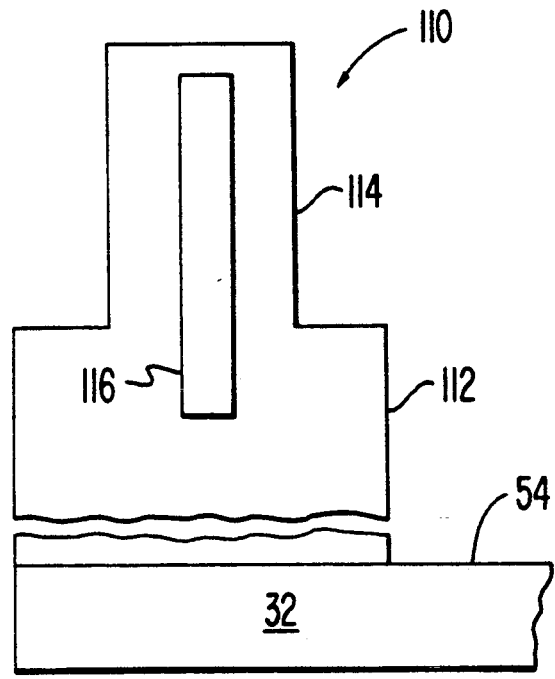
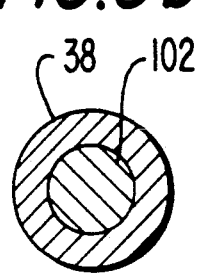
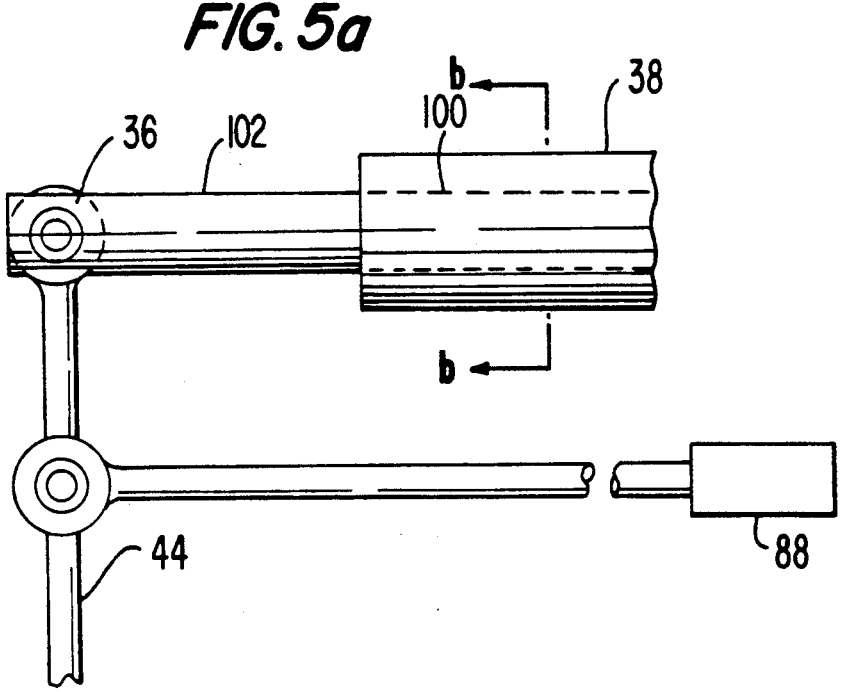

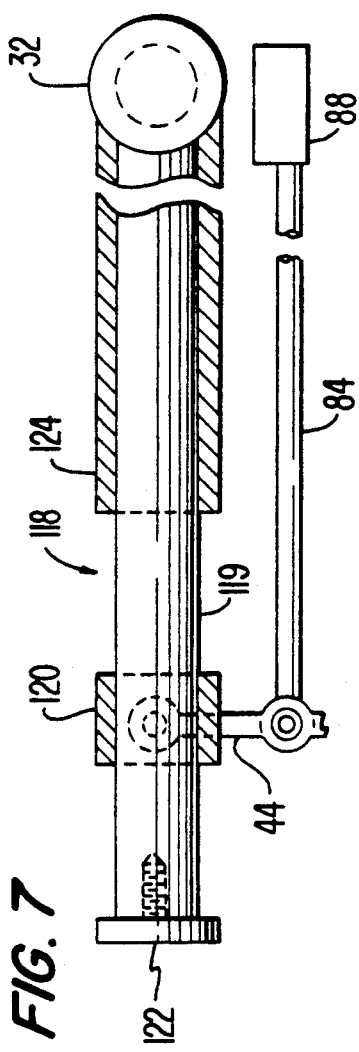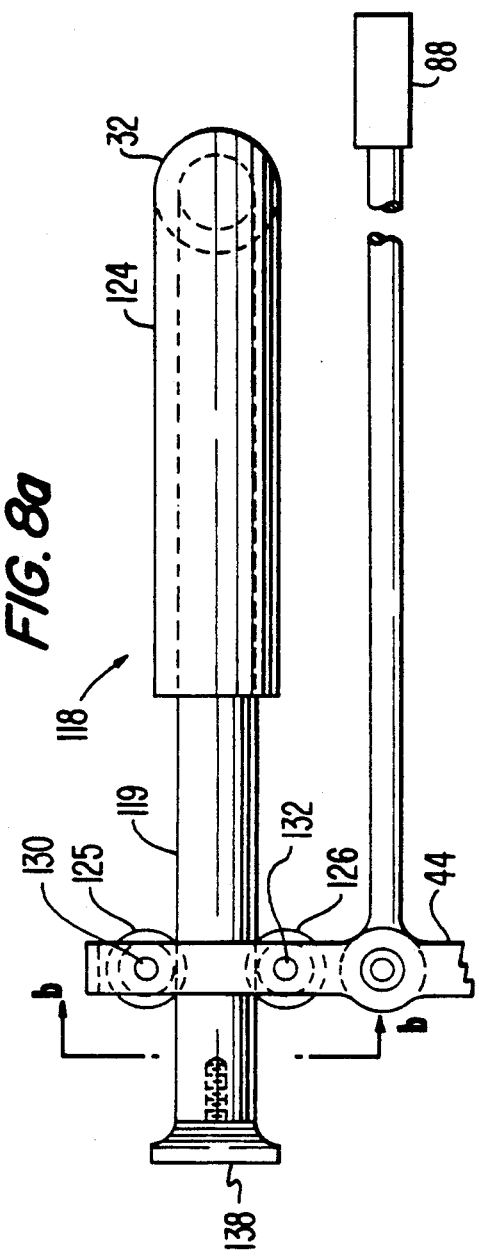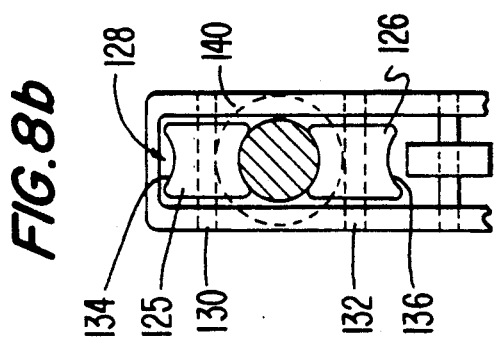

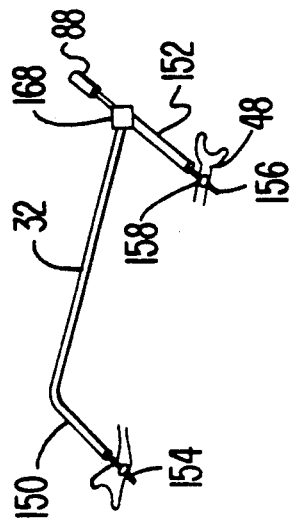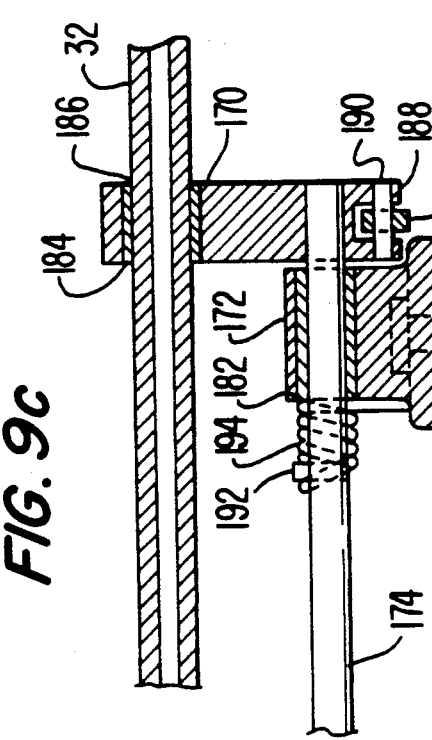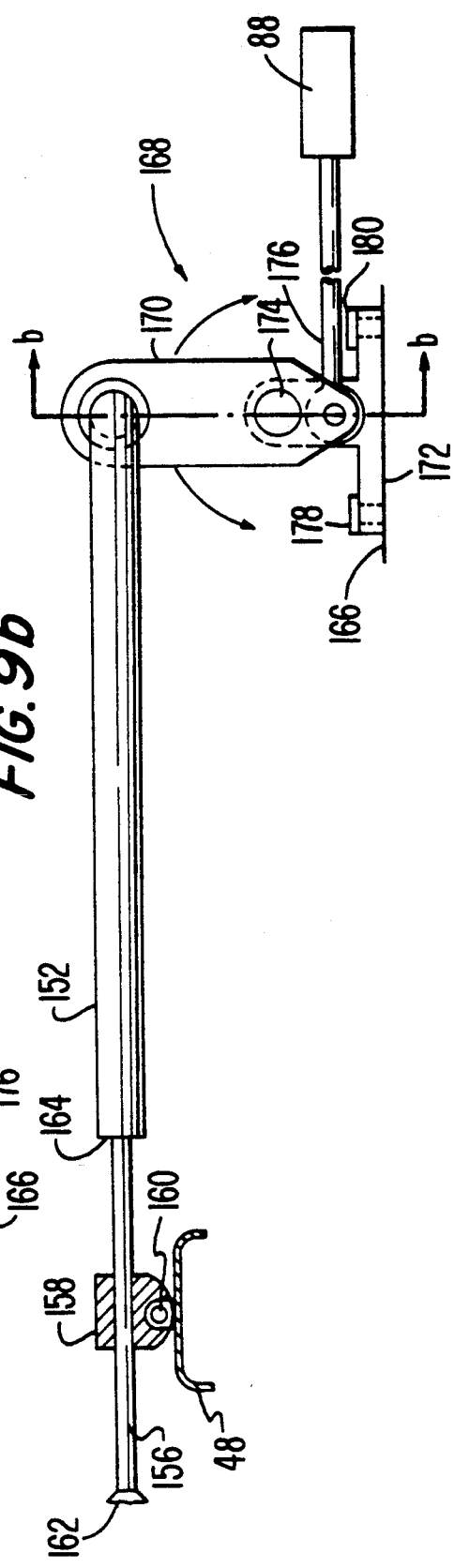
FIG. 9a
FIG. 9b
FIG. 9c

VARIABLE RATE TORSION CONTROL SYSTEM FOR VEHICLE SUSPENSION

BACKGROUND OF THE INVENTION

1. Field of the Invention

The present invention relates to an automotive suspension system including a torsion bar for providing roll and/or sway stabilization. The invention further relates to a system for varying the connection location of the torsion bar to a motor vehicle in order to selectively vary suspension characteristics of the vehicle.

2. Description of the Related Art

Torsion bars are used in vehicle suspension systems in various ways, most commonly as anti roll bars for resisting rolling and swaying motions that occur during vehicle movement. In addition, a torsion bar may be used in a vehicle as a spring to serve a weight bearing function. These functions are accomplished by connecting at least one end of the torsion bar to the suspension arm of a vehicle and either fixing the opposite end of the torsion bar to the frame of the vehicle or to another suspension arm of the vehicle.

Torsion bars are generally connected to vehicle suspension arms through a torsion arm extending from the torsion bar. By way of example, and as illustrated in FIG. 1, torsion bar 20 includes integrally formed torsion arms 22 and 24. The torsion bar 20 is rotatably connected to the underside of a vehicle 30 with sleeves 26 and 28. The distal ends of the torsion arms are connected to suspension arms 32 and 34 which in turn support the rear wheels of the vehicle 30.

FIGS. 2a-c, schematically illustrate three ways in which torsion bars may be used in a motor vehicle. In FIG. 2a, torsion bars are used to provide roll and sway resistance. In FIGS. 2b-c, the torsion bars are used to serve a weight bearing function. By way of example, the related art and the present invention will be hereinafter discussed in connection with the arrangement shown in FIG. 2a, which corresponds to FIG. 1. However, the present invention is not limited to this arrangement.

During cornering, the body of a vehicle has a tendency to roll towards the outside of the turn. When this occurs, the suspension arms at the outside of the turn become compressed toward the body of the vehicle while the suspension arms on the inside of the turn move away from the body of the vehicle. A torsion bar connected between the inside and outside suspension arms resists this motion by transferring forces from one side of the suspension system to the other, thereby resisting roll. For example, if the vehicle in FIG. 1 were to turn towards the left at high speed, the suspension arm on the right side of the vehicle would move in an upward direction causing the torsion bar to rotate counterclockwise. This would exert an upward force on the left rear suspension arm countering its natural tendency to move downward. Simultaneously, an upward force would be transmitted to the right side of the vehicle through rotatable mount 26 and a downward force applied through mount 28.

Torsion bars can be constructed of different materials such as spring steel, and in different sizes in order to provide an automobile with desired performance characteristics. For example, provided all other variables remain constant, the higher the torsion modulus of a torsion bar, the greater roll resistance that will be imparted to the automobile. High roll resistance enhances an automobile's steering performance, especially when the vehicle is moving at high speeds and on smooth surfaces. On the other hand, when the vehicle is traveling along rough and uneven surfaces, high roll resistance may decrease traction. In addition, on rough roads, even at slow speeds, a torsion bar with a high torsion modulus provides a bumpy and uncomfortable ride.

Thus, automobile manufacturers are often required to assess the trade-offs between torsion bars of high and low moduli of torsion, and usually have to make a compromise so that handling performance is acceptable under all road conditions. Of course, by making this compromise, handling performance can never be optimized under all road conditions.

In order to overcome this drawback of the prior art, attempts have been made to provide automobiles with torsion bars having selectively variable moduli of elasticity. For example, U.S. Pat. No. 4,796,991, describes a torsion bar split at its midpoint and having an adjuster disposed therebetween. The adjuster includes a chamber filed with magnetic fluid. When a magnetic field is energized, it causes internal friction in the magnetic fluid, thereby increasing the torsion modulus.

In U.S. Pat. No. 4,805,929, a control cylinder having a piston is connected between the wheel suspension of a vehicle and an end of an arm connected to the torsion bar. Fluid is supplied to the cylinder to lock the piston in a fixed position within the cylinder thereby providing stability through the torsion bar, or to permit the piston to move within the cylinder, effectively disengaging the torsion bar.

There are a number of drawbacks with the previously described related art systems. First, they are relatively complex and expensive to manufacture, and are therefore impractical from an economic standpoint. In addition, in the related art systems, if the electrical system of the vehicle fails while the suspension system is in a low stability mode, the suspension system may be prevented from returning to the high stability mode. This could create an extremely hazardous condition which could lead to the vehicle flipping over during a turn.

SUMMARY OF THE INVENTION

An object of the invention is to provide a variable suspension system for a motor vehicle that permits the suspension characteristics to be selectively adjusted depending upon driving conditions.

Another object of the present invention is to provide a suspension system for a motor vehicle that is less complex and less expensive than currently known systems.

A further object of the invention is to provide a variable suspension system for a motor vehicle that automatically defaults to a high-stabilizing mode in the event of an electrical system failure.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purposes of the invention, as embodied and broadly described herein, the invention comprises torsion conveying means for conveying torsional forces from one location on a motor vehicle to another location on a motor vehicle, transfer means for conveying forces from a wheel suspension component to the torsion conveying means, and varying means connecting the wheel suspension component to the transfer means, the varying means being adjustable for selectively regulating an amount of leverage force applied to the torsion conveying means as the motor vehicle moves.

Preferably, the torsion conveying means is a torsion bar and the transfer means is a torsion arm connected to an end of the torsion bar. It is also preferable that the varying means is capable of maintaining a first predetermined fixed distance between an engagement location and the torsion bar to achieve a first desired suspension characteristic, and is also capable of maintaining a second predetermined fixed distance between the engagement location and the torsion bar to achieve a second predetermined suspension characteristic.

By varying the distance between the torsion bar and the connection location, the length of the lever arm acting on the torsion bar changes. As the lever arm lengthens, a given force acting on the end of the arm is able to exert a greater torsion in the torsion bar causing the torsion bar to twist. By twisting the bar absorbs rather than transmits forces acting upon it. Due to this phenomena, by selectively lengthening the lever arm, suspension characteristics are varied.

In addition, by manufacturing the torsion arm of a material that has a susceptibility to bending, as the distance from the torsion bar increases, the system can be given an additional measure of bump compliance. This occurs because forces can be absorbed within the torsion arm itself and these absorbed forces are therefore not transmitted to the torsion bar.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 4a is a top view of a torsion arm assembly in accordance with a first embodiment of the present invention;

FIG. 4b is a partially cross-sectioned side view taken along the line b—b in FIG. 4a;

FIG. 4c is a front view of the torsion arm assembly of FIG. 4a as viewed from the direction C in FIG. 4a;

FIGS. 5a-b illustrate portions of a suspension assembly in accordance with a second embodiment of the present invention;

FIG. 6 illustrates a torsion arm in accordance with a third embodiment of the present invention;

FIG. 7 illustrates a partially cross-section side view of a portion of a suspension assembly in accordance with a fourth embodiment of the present invention;

FIG. 8a illustrates a side view of a portion of a fifth embodiment of the present invention;

FIG. 8b is a partially sectioned front view taken along the line b—b in FIG. 8a;

FIG. 9a schematically illustrates a sixth embodiment of the present invention;

FIG. 9b is a partially sectioned side view of the sixth embodiment of the present invention;

FIG. 9c is a cross-sectional view taken along the line b—b in FIG. 9b; and

DESCRIPTION OF THE PREFERRED EMBODIMENTS

Reference will now be made in detail to the present preferred embodiments of the invention, examples of which are illustrated in the accompanying drawings. Whenever possible, the same reference numbers will be used throughout the drawings to refer to the same or like parts.

Figure 3:
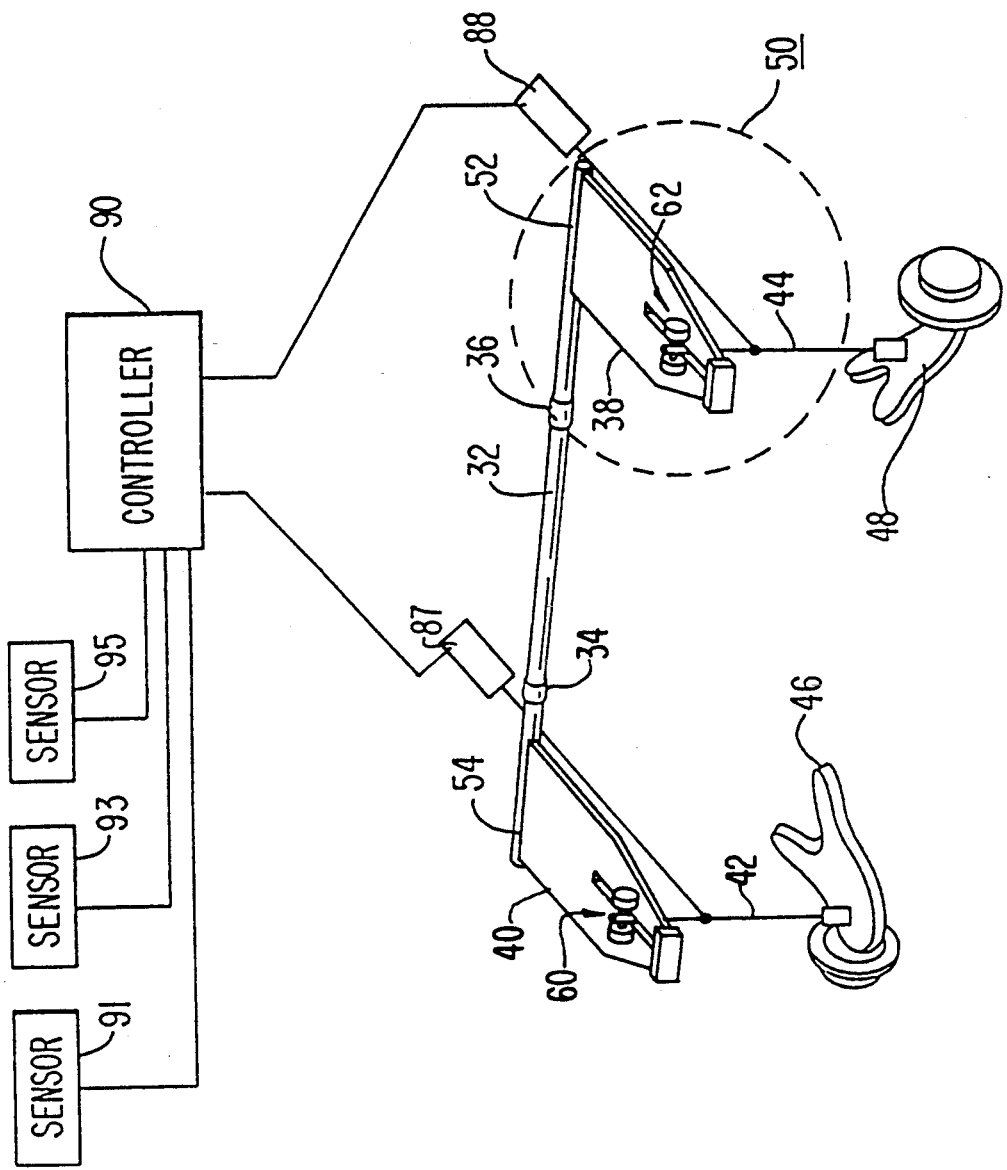
FIG. 3 is a schematic diagram illustrating the general principles of the present invention.

As illustrated in FIG. 3, torsion bar 32 is pivotally mounted to the frame of a motor vehicle (not shown) through sleeves 34 and 36. Torsion arms 40 and 38 extend from opposite ends of torsion bar 32, and are connected through struts 42 and 44 to suspension arms 46 and 48. The struts 42 and 44 are moveably connected to torsion arms 40 and 38, respectively, so that the distance between the ends of the struts and the torsion bar may be varied. By moving the connection location of the struts farther from the torsion bar, the automobile is provided with a softer ride and with a reduced amount of roll resistance. On the other hand, as th distance between the connection location and the torsion bar is shortened, the ride becomes harder, with greater roll resistance.

This phenomena occurs because the torsion arm acts as a lever. As the connection point is moved farther from the torsion bar, a given force applied through a strut will exert a greater amount of leverage on the torsion bar. Because the torsion bar has a fixed amount of resistance built into it, by applying more leverage, the resistance is overcome and the torsion bar begins to twist at a greater rate. The amount of twisting that occurs in the torsion bar has a direct bearing on the suspension characteristics of the vehicle. For example, as the amount of twisting increases, the roll and sway resistance decreases because energy is absorbed by the bar rather than being transmitted through it. In contrast, as the lever arm is shortened, the torsion bar is less prone to twisting, and forces applied to the bar are conveyed through the bar rather than being absorbed by internal twisting. This is the general principle of the invention. The manner in which the strut and the torsion bar arm are interconnected, and the mechanism used for varying the distance between the torsion bar and the connection location can vary. A number of examples are illustrated in FIGS. 4-10.

FIGS. 4a-c illustrate one embodiment of the invention, and contain a detailed view of components generally illustrated in dotted circle 50 of FIG. 3.

In accordance with the present invention there is provided torsion conveying means for conveying torsional forces from one location on a motor vehicle to another location on a motor vehicle. As broadly illustrated in FIG. 3, and as shown in detail in FIG. 4a, torsion conveying means includes torsion bar 32 having first and second opposing end portions 52 and 54. The torsion bar 32 can be connected to a motor vehicle at various locations, however, and as mentioned earlier, by way of example only, the invention will be discussed in connection with a torsion bar that is connected to the wheel suspension on opposite sides of a motor vehicle. When connected in this manner, forces, applied to a wheel, that are orthogonal to the frame of the vehicle, are rotationally transferred via the torsion bar to a wheel suspension on an opposite side of the vehicle.

In accordance with the present invention there is also provided transfer means for transferring forces from a wheel suspension component to the torsion conveying means. As embodied in the first embodiment of the invention, the transfer means includes torsion arm 38 having an elongated slot 56 disposed therein. Torsion arm 38 may be constructed of a flat sheet of spring steel which is inserted in an opening 58 in the first end 52 of torsion bar 32. Alternatively, torsion arm 38 may be integrally formed with torsion bar 32. In order to increase the magnitude and rate of flexure, torsion arm 38 may also be tapered at its distal end as shown in FIG. 4a, although the invention may be practiced with a non-tapered torsion arm. In the first embodiment of the invention, torsion arm 38 engages a wheel suspension component such as strut 44, which includes an engagement portion 62 at its distal end for engaging torsion arm 38 through slot 56. Forces acting on a vehicle's wheel are transferred through the suspension arm 48 and the strut 44 to the torsion arm 38. Torsion arm 38, in turn, transfers the forces to the torsion bar 32, thereby causing rotation of the torsion bar.

Also in accordance with the invention there is provided varying means, connecting the wheel suspension component to the transfer means, the varying means being adjustable for selectively regulating an amount of leverage force applied to the torsion conveying means as the motor vehicle moves. In accordance with the first embodiment of the present invention, the varying means includes an engagement assembly 62 located on a distal end of strut 44 for permitting the strut 44 to engage torsion arm 38 at various selectable locations. Engagement assembly 62 includes a series of rollers 64, 68, 70, 72, and 74 located on the distal end of the strut 44. Strut 44 has central shaft portion 76 about which roller 74 is mounted. Roller 74 has a diameter equal to or less than the width of slot 56, thereby permitting roller 74 to fit within and roll along the edges of slot 56. Engagement assembly 62 also includes a pair of axles 78 and 80 extending from strut 44, perpendicular to the central shaft portion 76 and respectively located on opposite sides of torsion arm 38. Rollers 64, 68, 70, and 72 are each mounted on an end of axles 78 and 80. In this manner, torsion arm 38 is rollably sandwiched between rollers 64, 68, 70, and 72, and therefore movement of strut 44 is substantially limited in either direction with respect to its elongated axis. In fact, all of the rollers 64, 68, 70, 72, and 74 cooperate with each other to substantially limit movement of the strut 44 relative to arm 38 in every direction except along the axis 82 of slot 56. Thus, strut 44 is movable between an innermost edge 57 of slot 56 and a stop 92 connected to an edge of torsion arm 38 farthest from torsion bar 32.

The varying means of the first embodiment of the invention may also include an actuator shaft 84 and an actuator 88. Actuator shaft 84 has a first end pivotally connected to strut 44 through a pivot pin 86, and a second end connected to actuator 88. Actuator 88 can operate either in a progressive controlled stroke or in a single step. By way of example, actuator 88 may include a hydraulic piston, or a ballscrew driven by either an electric or hydraulic motor. Actuator 88 is selectively actuatable to adjust the connection location between the strut 44 and torsion arm 38, and thereby regulates the amount of leverage and force applied to torsion bar 32. Specifically, because torsion arm 38 acts as a lever, as the strut 44 is moved away from torsion bar 32, the axial force conveyed through the strut exerts a greater amount of leverage on the torsion bar. Alternatively, as the strut is moved closer to the torsion bar, the amount of leverage decreases.

It is preferable that all actuators include a spring opposing the actuator force for moving strut 44 back towards the torsion bar 32. Thus, if there is an electrical failure in the motor vehicle as a whole or the actuation system in particular, the spring force will return the suspension of the vehicle to a maximum stability condition.

Operation of the first embodiment of the invention will now be described in connection with FIG. 3 and FIGS. 4a–c. As illustrated in FIG. 3, the previously described suspension assembly is provided on both ends 52 and 54 of a torsion bar 32. As the vehicle travels along a roadway, a controller 90 receives signals corresponding to the movement of the vehicle. These signals may correspond to velocity, acceleration, steering position, traction condition, and/or road conditions and may be generated by one or more sensors (91, 93, and 95) in the vehicle. The controller 90 sends a control signal to the actuators 87 and 88 to move the struts 42 and 44 and thereby vary the connection locations between the struts 42 and 44 and the torsion arms 40 and 38, respectively. During high speed cornering, for example, actuator 88 is deactivated so that it pulls strut 44 against an edge 57 of slot 56 closest to torsion bar 32. Actuator 87 performs a similar simultaneous function on the opposite side of the vehicle. During slower driving on a bumpy road, actuator 88 is actuated to move strut 44 away from torsion bar 32 and against stop 92. Once again, actuator 87 is simultaneously actuated.

Figure 1:
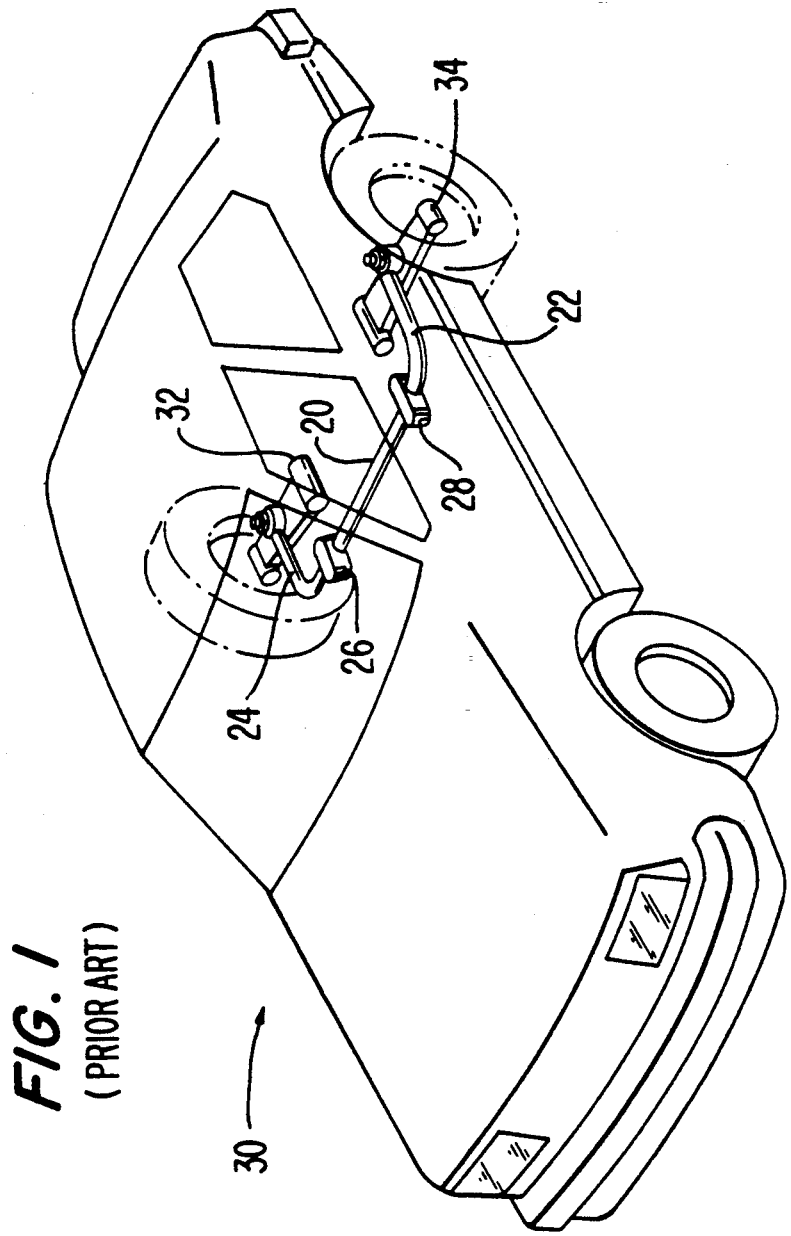
FIG. 1 is a perspective view of a motor vehicle having a conventional torsion bar roll stabilizer.
Figures 2A, 2B, 2C:
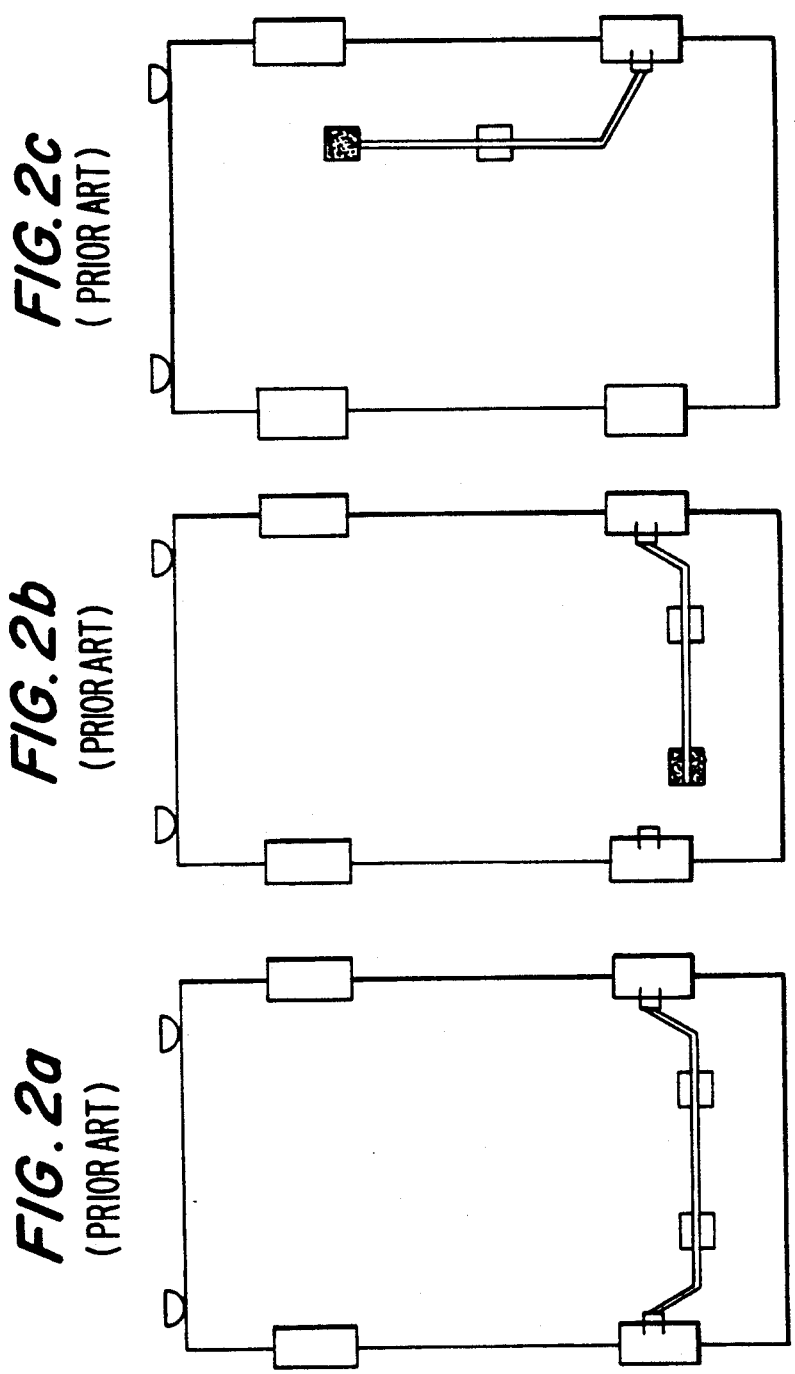
FIGS. 2a-c schematically illustrate conventional uses of torsion bars in motor vehicles.

As illustrated in FIG. 4a, the tapered end of arms 38 and 40 further enhance bump compliance because the arms bend more freely at the tapered ends absorbing forces from the struts and thereby allowing greater body roll. Specifically, forces transmitted through strut 42 and 44, bend the tapered ends of the arm, dissipating a portion of the force. Therefore, this dissipated force is not transmitted through the torsion bar. Of course, this embodiment, as well as the other embodiments of the invention need not be practiced using a system having a dual torsion arm arrangement. For example, as illustrated in FIGS. 2b and 2c, torsion bars can be used with a single torsion arm. If such an arrangement is used with the embodiment of FIG. 4, only one tapered arm would be needed.

Controller 90 can also be programmed to maintain struts 42 and 44 at various fixed locations relative to slot 56, depending upon varying driving conditions. For example, controller 90 may be programmed to continuously optimize the fixed position of the struts 42 and 44 as driving conditions continuously change. At the very least, the controller 90 is programmed to maintain the ends of the struts a first fixed distance from torsion bar to achieve a first suspension characteristic, and to maintain the ends of the struts a second fixed distance from the torsion bar to achieve a second suspension characteristic.

The second embodiment of the invention illustrated in FIGS. 5a–5b is similar to the first embodiment of the invention except for differences in the varying means. Instead of employing a series of rollers at the end of strut 44, strut 44 is connected via rotatable joint 36 to a distal end of dowel 102 which slides within a cylindrical opening 100 in torsion arm 38. With this arrangement no significant portion of torsion arm 38 or dowel 102 extends beyond strut 44, thereby eliminating the possibility of harmonic vibrations under certain road and speed conditions.

The third embodiment of the invention illustrated in FIG. 6 is similar to the first embodiment of the invention except for the shape of the torsion arm. Torsion arm 110 is stepped rather than tapered, and includes a first portion 112 having substantially parallel edges and connected to an end 52 of torsion bar 32. A second portion 114, also having substantially parallel edges has a reduced width and extends from portion 112. The second portion extends from the first portion in a stepped manner. An elongated slot 116 extends through both the first and second portions 112 and 114, respectively. The slot 116 is for receiving roller assembly 62 extending from strut 44. As with the tapered arm 38, the reduced dimensions at the end of stepped torsion arm 110 permit the arm to bend more freely at its end, further enhancing bump compliance and allowing greater body roll. However, due to the stepped nature of arm 110, bump compliance is enhanced in an accelerated manner as opposed to the gradual enhancement that occurs with the tapered arm.

A fourth embodiment of the invention is illustrated in FIG. 7 and operates in a manner similar to the previous embodiments except for the following differences in the varying means. Rather than employing a flat slotted torsion arm, the fourth embodiment of the invention employs a cylindrical torsion arm 118 and a moveable sleeve 120 that is slidable along a portion of torsion arm 118. The cylindrical torsion arm 118 consists of a first cylindrical member 119 connected to torsion bar 32, and a fixed sleeve 124 extending over a portion of cylindrical member 119, adjacent to torsion bar 32. Movable sleeve 120 is slidable along cylindrical member 119, and has a range of movement that is limited by a cap 122 mounted on the distal end of cylindrical member 119, and sleeve 124.

Strut 44 is pivotably mounted to moveable sleeve 120, and actuator shaft 84 is connected at one of its ends to actuator 88 and is pivotably mounted at an opposite end to strut 44. When actuator 88 is activated, sleeve 120 moves along cylindrical member 119 in the direction of cap 122. As the moveable sleeve 120 moves away from fixed sleeve 124, the stiffening effect of sleeve 124 is gradually reduced, until, at full extension, the core bar is able to flex considerably, thereby dissipating a portion of forces applied thereto from the strut 44, without transferring these forces to torsion bar 32. In addition, as sleeve 120 moves towards cap 122, forces acting on strut 44 apply increased leverage to torsion bar 32, which enhances twisting of the bar. Upon deactivation of actuator 88, sleeve 120 is urged against fixed sleeve 124.

A fifth embodiment of the invention is illustrated in FIGS. 8a–b and is similar to the embodiment of FIG. 7 except for the following differences in the varying means. Rather than employing a moveable sleeve 120, the fifth embodiment of the invention employs a pair of rollers 125 and 126, for sandwiching the cylindrical member 119 of torsion arm 118 therebetween. The distal end of strut 44 includes an opening 128 for housing rollers 125 and 126 on shafts 130 and 132, respectively. Rollers 130 and 132 include edges 134 and 136, shaped to conform to cylindrical member 119 in order to limit lateral movement of strut 44 relative to cylindrical member 119. For example, when cylindrical member 119 is substantially circular in cross-section as illustrated in FIG. 8b, edges 134 and 136 have a semicircular arc shape. Of course, other shapes can be used depending upon the shape of cylindrical member 119. Cylindrical member 119 passes through opening 128 and between roller 125 and 126.

Similar to the fourth embodiment, the fifth embodiment employs a cap 138 disposed on the end of cylindrical member 119 and a fixed sleeve 124 mounted on cylindrical member 119. End cap 138 and fixed sleeve 124 limit the range of travel of the strut 44 relative to the torsion arm 118.

As illustrated in FIG. 8b, rollers 125 and 126 are sized slightly smaller than the opening 128 in strut 44. This permits an amount of play between the strut 44 and the cylindrical member 119. However, the shaped surfaces 134 and 136 of rollers 125 and 126, together with wall 140 surrounding opening 128 in strut 44, limit the lateral movement of cylindrical member 119 relative to strut 44.

A sixth embodiment of the invention is illustrated in FIGS. 9a–c. In this embodiment, the component of the wheel suspension, to which the transfer means is connected, is the suspension arm of a vehicle. This embodiment also differs from the previous embodiments in that, rather than moving the wheel suspension component, the torsion bar itself is moved to adjust the spacing between the torsion bar and the connection location.

As illustrated in FIG. 9a, torsion bar 32 is integrally formed with portions of torsion arms 150 and 152, respectively. Torsion arm dowels 154 and 156 form the ends of torsion arms 150 and 152. As shown in detail in FIG. 9b, bushing 158 is pivotably mounted on suspension arm 48 through a pivot pin 160. Bushing 158 is slidably mounted on torsion dowel 156 and has a range of sliding motion limited by a cap 162 on the end of torsion dowel 156 and an edge 164 of torsion arm 152.

Torsion bar 32 is mounted to the frame 166 of a motor vehicle through a pivot assembly 168. Pivot assembly 168 includes a rotatable pivot arm 170, a mounting bracket 172, a pivot shaft 174, and an actuator arm 176. Mounting bracket 172 is mounted to the vehicle frame with bolts 178, 180, and includes a pivot shaft opening having a shaft bushing 182 disposed therein. Pivot shaft 174 extends through the pivot shaft opening and rotates within bushing 182. The pivot arm 170 is mounted on an end of shaft 174 adjacent mounting bracket 172, and includes an end opening 186 having a bushing 184 disposed therein for rotatably receiving torsion bar 32. An opposite, notched end 188 of pivot arm 170 pivotably retains an end of actuator arm 176 via pin 190.

A spring stop 192 extends from pivot shaft 174 and a coiled spring 194 is mounted about shaft 174 and is interposed between spring stop 192 and mounting bracket 172. Thus, when actuator 88, which is connected to the end of actuator shaft 176 is actuated, pivot arm 170 and pivot shaft 174 are rotated in a clockwise direction against the force of spring 194. As pivot arm 170 rotates in a clockwise direction, the entire torsion bar 32 is moved so that the distance between suspension arm 48 and torsion bar 32 increases, thereby decreasing the effects of the torsion bar on the suspension of the vehicle. When the actuator 88 is deactivated, pivot arm 170 rotates in a counterclockwise direction moving the torsion bar 32 closer to the suspension arm 48, and increasing the effects of the torsion bar on the suspension of the vehicle. Spring 194 ensures complete return of the torsion bar to the highest stability position.

Figure 10:
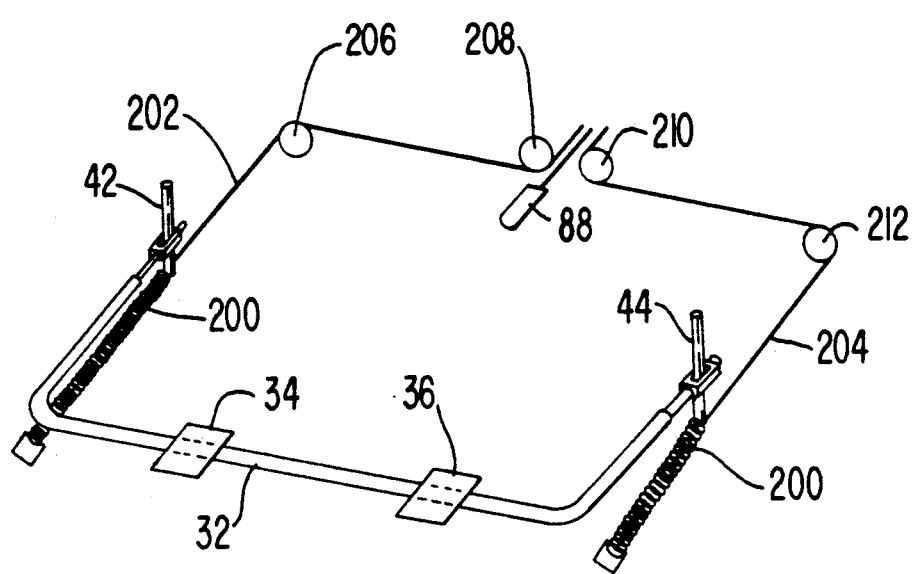
FIG. 10 schematically illustrates an eighth embodiment of the present invention.

A seventh embodiment of the invention is schematically illustrated in FIG. 10. This embodiment is similar to the embodiment of FIG. 7, but replaces the actuator arms with a cable and pulley system. The seventh embodiment is similar to embodiments 1-5 in as much as the torsion bar remains in a fixed position through sleeves 34 and 36, and &.he struts 42 and 44 are moved relative to torsion bar 32. As illustrated in FIG. 10, struts 42 and 44 of a motor vehicle are each connected to a spring 200. Springs 200 move struts 42 and 44 to a high stability position relative to torsion bar 32. Cables 202 and 204 each include an end connected to one of struts 42 and 44, and each also include an opposite end connected to actuator 88 through a series of pulleys 206, 208, 210, and 212. When actuator 88 is activated, it pulls cables 202 and 204, thereby urging struts 42 and 44 away from torsion bar 32, and against the force of springs 200. In this manner, the effects of the torsion bar on the suspension system of the motor vehicle are reduced. When actuator 88 is deactivated, the springs 200 return struts 42 and 44 to a high stability position.

It will be apparent to those skilled in the art that various modifications and variations can be made to the present invention without departing from the scope or spirit of the invention.

Other embodiments of this invention will be apparent to those skilled in the art from consideration of the specification and practice of the invention disclosed herein. For example, a pair of hydraulic cylinders may be mounted on ends of the torsion bar in place of the arms described above. Thus, it is intended that the specification and examples be considered as exemplary only, with a true scope and spirit of the invention being indicated by the following claims.

What is claimed is:

1. A stabilizing apparatus for a motor vehicle, comprising:
    torsion conveying means for conveying torsional forces from one location on a motor vehicle to another location on a motor vehicle;
    transfer means for conveying forces from a wheel suspension component to the torsion conveying means, the transfer means includes at least one elongated torsion arm having a central axis; and
    varying means including an actuator, the varying means connecting the wheel suspension component to the transfer means at an engagement location that is selectively variable relative to the torsion conveying means to thereby permit selective regulation of leverage force from the suspension component to the torsion conveying means, the actuator being oriented so that a resulting force applied by the actuator at the engagement location is parallel to the central axis of the torsion arm.

2. An apparatus as set forth in claim 1 wherein the torsion conveying means includes a torsion bar having first and second opposing end portions, the transfer means includes an arm extending from the first end portion of the torsion bar for engagement with the wheel suspension component at the engagement location, and wherein the actuator is arranged to selectively maintain a first predetermined fixed distance between the engagement location and the torsion bar to achieve a first desired suspension characteristic, and a second predetermined fixed distance between the engagement location and the torsion bar to achieve a second predetermined suspension characteristic.

3. An apparatus according to claim 2 further including a torsion arm extending from the second end portion of the torsion bar for engagement with the motor vehicle at a second engagement location thereon.

4. An apparatus according to claim 3 wherein the second engagement location is fixed on a chassis of the motor vehicle.

5. An apparatus according to claim 3 wherein the first and second engagement locations are located on wheel suspension components on opposite sides of the motor vehicle.

6. An apparatus according to claim 5 wherein at least one of the torsions arms is tapered at a distal end thereof opposite the torsion conveying means.

7. An apparatus according to claim 3 wherein the first and second connection locations are on suspension arms of the vehicle, and the varying means includes connectors attached to the suspension arms, the torsion bar and the torsion arms extending therefrom being movable relative to the connectors on the suspension arms.

8. An apparatus according to claim 7, further including means for moving the torsion bar, the moving means including a pivot lever having first and second ends and a pivot axle located therebetween, the first end of the pivot lever being connected to the torsion bar, the second end of the pivot lever being connected to an actuator, and the pivot axle being mounted to the vehicle.

9. An apparatus according to claim 2 wherein the arm extending from the first end portion has a width proximate the torsion bar greater than a width at an opposing distal end thereof.

10. An apparatus according to claim 2 wherein the torsion arm is substantially flat.

11. An apparatus according to claim 10 wherein the torsion arm includes a longitudinally extending slot disposed therein, and the varying means includes an engagement assembly disposed on the end of a strut, the engagement assembly having a portion location in the slot for movement within the slot.

12. An apparatus according to claim 11 wherein the adjusting means includes an actuator connected to the strut for moving the strut relative to the slot.

13. An apparatus according to claim 11 wherein the engagement assembly includes a plurality of rollers for sandwiching the torsion arm therebetween.

14. An apparatus according to claim 2 wherein the torsion arm and the torsion bar are integrally formed.

15. An apparatus according to claim 2 wherein the varying means includes a strut assembly including a strut and a pair of rollers located on a distal end portion thereof, the rollers located on opposite sides of the torsion arm for sandwiching the torsion arm therebetween.

16. An apparatus according to claim 15 wherein the pair of rollers includes means for preventing lateral movement of the arm relative to the pair of rollers.

17. An apparatus according to claim 1 wherein the torsion conveying means is a torsion bar, the transfer means is a torsion arm extending from the torsion bar, and the varying means includes a strut assembly having a strut and a sleeve located on a distal end of the strut, the sleeve being movable along the torsion arm.

18. An apparatus according to claim 17 further including adjusting means for moving the strut assembly relative to the torsion arm.

19. An apparatus according to claim 1 wherein the varying means includes a connector movably located on the transfer means, spring means operatively connected to the connector for moving the connector in a direction towards the torsion conveying means, and adjusting means operatively connected to the connector for selectively moving the connector away from the torsion conveying means against the force of the spring means.

20. An apparatus as set forth in claim 1, further including means for detecting a motion of the vehicle and for transmitting a motion signal in accordance therewith and means, responsive to said motion signal for regulating the varying means to vary a distance between the torsion conveying means and the engagement location as a function of the motion signal.

21. A motor vehicle, comprising:
a suspension system having suspension arms for supporting wheels on opposite sides of the vehicle;
a torsion bar assembly including a bar having torsion arms on opposite ends thereof the torsion arms each having parallel central axes and each torsion arm being connected to an opposing suspension arms at a respective engagement location;
means for transmitting a control signal corresponding to a driving condition; and
means, responsive to the control signal, for adjusting a distance between each respective engagement location and the torsion bar to selectively change a leverage force acting on the torsion bar during movement of the vehicle, the adjusting means including an actuator being oriented so that a resulting force applied by the actuator at the engagement locations is parallel to the central axes of the torsion arms.

22. A motor vehicle according to claim 21 wherein the adjusting means moves a portion of the suspension system relative to the torsion bar.

23. A motor vehicle according to claim 21 wherein the adjusting means moves the torsion bar relative to a portion of the suspension system.

24. A stabilizing apparatus for a motor vehicle, comprising:
torsion conveying means for conveying torsional forces from one location on a motor vehicle to another location on a motor vehicle;
transfer means for conveying forces from a wheel suspension component to the torsion conveying means; and
varying means, connecting the wheel suspension component to the transfer means and including a connector movably located on the transfer means, spring means for moving the connector in a direction towards the torsion conveying means, and adjusting means for selectively moving the connector away from the torsion conveying means against the force of the spring means, the varying means being adjustable for selectively regulating an amount of leverage force applied to the torsion conveying means as the motor vehicle moves.

25. An apparatus according to claim 24 wherein the adjusting means includes a cable connected to the movable connector, and an actuator for pulling the cable.

26. A method for varying the suspension characteristics of a motor vehicle having a torsion bar and an arm, the arm having a central axis and connecting the torsion bar to an engagement location on the motor vehicle, the method comprising the steps of:
maintaining a fixed predetermined first distance between the torsion bar and the engagement location in order to achieve a first suspension characteristic;
varying, in the direction of the central axis of the arm, the position of the engagement location relative to the torsion bar by applying a purely linear force at the engagement location parallel to the axis of the arm, while the motor vehicle is moving, to increase the distance between the torsion bar and the engagement location; and
maintaining a fixed predetermined second distance between the torsion bar and the engagement location in order to achieve a second suspension characteristic, different from the first suspension characteristic.

27. A stabilizing apparatus for a motor vehicle, comprising:
a torsion bar for conveying torsional forces from one location on a motor vehicle to another location on a motor vehicle;
an extensible torsion arm having a central axis and being connected to an end of the torsion bar, the torsion arm including a shaft having a smooth serration-free outer surface which is movable within a tubular member having a complementary smooth inner surface, the shaft being constructed to bend in use;
a strut having a first end connected to a wheel suspension component and a second end connected to the shaft for selective movement relative to the torsion bar in the direction of the axis of the torsion arm; and
means, operatively connected to the strut for varying the distance between the strut and torsion bar so that as the distance between the strut and the torsion bar increases, the torsion arm is capable of applying increased leverage force to the torsion bar and the shaft flexes to comply with road bumps encountered by the motor vehicle.

28. A stabilizing apparatus for a motor vehicle, comprising:
a torsion bar;
an torsion arm having a central axis, a first end region connected to an end of the torsion bar, and an opposing distal end region, the torsion arm having a first width in the first end region and a corresponding second width less than the first width in the distal end region;
a strut having a first end connected to a wheel suspension component and second end connected to the torsion arm for selective movement along the torsion arm between the first end region and the distal end region;
means, operatively connected to the strut for moving the second end of the strut between the first end region and the second end region of the torsion arm to thereby selectively vary leverage force applied to the torsion bar and to also vary an amount of force necessary to bend the torsion arm.

29. An apparent according to claim 28 wherein the torsion arm is tapered between the first end region and the distal end region.

30. An apparatus according to claim 28 wherein the torsion arm is stepped between the first end region and the distal end region.

* * * * *

UNITED STATES PATENT AND TRADEMARK OFFICE
CERTIFICATE OF CORRECTION

PATENT NO. : 5,288,101
DATED : February 22, 1994
INVENTOR(S) : Milford M. Minnett It is certified that error appears in the above-indentified patent and that said Letters Patent is hereby corrected as shown below:

Claim 1, column 9, line 48, change "includes" to --including--.

Claim 21, column 11, line 24, change "thereof the" to --thereof, the--;

line 27, change "arms" to --arm--.

Signed and Sealed this

Second Day of August, 1994

*Attest:*

BRUCE LEHMAN

*Attesting Officer*       *Commissioner of Patents and Trademarks*